United States Patent [19]

Kiovsky

[11] 4,033,889

[45] July 5, 1977

[54] TERPOLYMER DISPERSANT - VI IMPROVER

[75] Inventor: Thomas E. Kiovsky, Houston, Tex.

[73] Assignee: Shell Oil Company, Houston, Tex.

[22] Filed: Oct. 18, 1976

[21] Appl. No.: 733,573

[52] U.S. Cl. .......................... 252/56 D; 260/878 R
[51] Int. Cl.² .................. C10M 1/28; C10M 3/22
[58] Field of Search ............... 252/56 D; 260/878 R

[56] References Cited

UNITED STATES PATENTS

| 3,197,409 | 7/1965 | de Vries | 252/56 D |
| 3,231,498 | 1/1966 | de Vries | 260/878 R X |
| 3,687,905 | 8/1972 | Dorer | 260/878 |
| 3,879,304 | 4/1975 | Waldbillig | 260/878 R |
| 3,923,930 | 12/1975 | Waldbillig | 260/878 R |
| 3,954,812 | 5/1976 | Puskas et al. | 252/56 D X |

Primary Examiner—Delbert E. Gantz
Assistant Examiner—J. Thierstein
Attorney, Agent, or Firm—Dean F. Vance

[57] ABSTRACT

Lubricating oil additives having both dispersant and viscosity-index improving properties are prepared by reacting terpolymers of ethylene, a $C_3$ to $C_8$ alpha-olefin, and a non-conjugated diene with maleic anhydride and certain alkane polyols.

10 Claims, No Drawings

TERPOLYMER DISPERSANT - VI IMPROVER

BACKGROUND OF THE INVENTION

The newer engines place increased demands on the lubricants to be employed. In the past a number of different additives have been added to lubricating oils to improve such properties as viscosity index and dispersancy. Significant reductions in cost can be made by employing a single additive that improves a number of lubricant properties. However, in attempting to improve more than a single lubricant property, care must be taken in not causing the deterioration of other properties. For example, while the modified EPDM polymer additive disclosed in U.S. Pat. No. 3,864,368 may improve both dispersancy and viscosity characteristics over a narrow range, by employing an oxidation step to attach polar groups to the polymer backbone the patentees have reduced lubricant stability by introducing sites for oxidative attack. Likewise, the lubricant additive disclosed in U.S. Pat. No. 3,842,010, lacks a certain amount of oxidative stability due to the employment of an epoxidation step to attach polyamine groups to the polymer backbone.

A new lubricant additive having both dispersant and viscosity-index improving properties as well as good oxidative stability has now been found.

SUMMARY OF THE DISCLOSURE

Ashless, oil-soluble additives having both dispersant and viscosity-index (VI) improving properties are prepared by the process comprising:

a. reacting a terpolymer with maleic anhydride at a temperature of between about 180° C and 250° C wherein the terpolymer has a molecular weight of between about 70,000 and 150,000 and wherein the terpolymer comprises about 30 to 85 mole percent ethylene, about 15 to 70 mole percent of a $C_3$ to $C_8$ alpha monoolefin and about 1 to about 20 mole percent of a $C_5$ to $C_{14}$ non-conjugated diene; and b. reacting the product of step (a) with an alkane polyol having at least two hydroxy groups.

DETAILED DESCRIPTION OF THE INVENTION

One significant aspect of the present invention is that the terpolymer employed as the starting material need not be of the ultimate desired molecular weight range of 70,000 to 150,000. If desired, terpolymers having molecular weights of 150,000 to 1,000,000 may also be employed. As part of the present invention, the derivatized terpolymer of higher-than-desired molecular weight may be subjected to a shearing process as hereinafter described to reduce the molecular weight and improve molecular weight distribution to the desired range.

The terpolymers employed in the instant invention are well known. For example, ethylene - propylene-non-conjugated diene terpolymers are well known articles of commerce. The preparation of typical terpolymers, using Ziegler-Natta catalysts, is described for example in U.S. Pat. Nos. 2,993,480; 3,000,866; and 3,093,621. These terpolymers, which are primarily produced for use in elastomeric compositions, are characterized by the absence of chain or backbone unsaturation and contains sites of unsaturation in groups which are pendant to or are in cyclic structures outside of the main polymer chain. These structures render the polymers particularly resistant to breakdown by atmospheric oxidation or ozone.

Useful terpolymers for the production of the derivatized products of this invention comprise ethylene, a $C_3$ to $C_8$ straight or branched chain alpha-olefin and a non-conjugated diene. Representative non-limiting examples of non-conjugated dienes that may be used as the third monomer in the terpolymer include:

a. Straight chain acyclic dienes such as : 1,4-hexadiene; 1,5-heptadiene, 1,6-octadiene.

b. Branched chain acyclic dienes such as: 5-methyl-1,4-hexadiene; 3,7-dimethyl 1,6-octadiene; 3,7-dimethyl 1,7-octadiene; and the mixed isomers of dihydro-myrcene and dihydro-cimene.

c. Single ring alicyclic dienes such as: 1,4-cyclohexadiene; 1,5-cyclootadiene; 1,5-cyclododecadiene, 4-vinylcyclohexene; 1-allyl,4-isopropylidene cyclohexane; 3-allyl-cyclopentene; 4-allyl cyclohexene and 1-isopropenyl-4-(4-butenyl) cyclohexane.

d. Multi single ring alicyclic dienes such as: 4,4'-dicyclopentenyl and 4,4'-dicyclohexenyl dienes.

e. Multi-ring alicyclic fused and bridged ring dienes such as: tetrahydroindene; methyl tetrahydroindene; dicyclopentadiene; bicyclo(2.2.1) hepta 2,5-diene; alkenyl, alkylidene, cycloalkenyl and cycloalkylidene norbornenes such as: 5-methylene-6-methyl-2-norbornene; 5-methylene-6,6-dimethyl-2-norbornene; 5-propenyl-2-norbornene; 5-(3-cyclopentenyl)-2-norbornene and 5-cyclohexylidene-2-norbornene.

In general, useful terpolymers contain non-conjugated dienes having 5 to 14 carbon atoms and exhibit weight average molecular weights of from 70,000 to 1,000,000 e.g., 70,000 to 150,000. Preferred idienes include ethylidene norbornene, dicyclopentadiene and 1,4 hexadiene.

Structurally, the terpolymers suitable for conversion to the succinates of the present invention may be illustrated for various non-conjugated diene monomers as random terpolymers in which the following moieties are linked in the polymer chain in a random sequence and in a varying number.

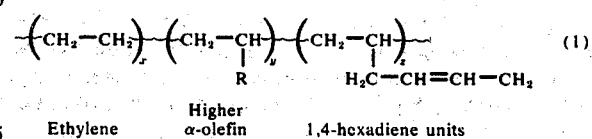

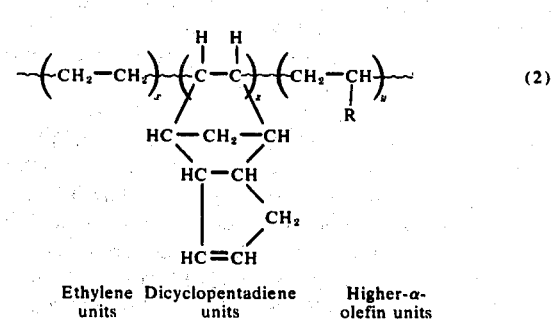

-continued

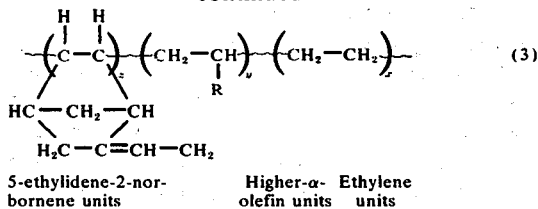

5-ethylidene-2-nor-bornene units

Higher-α- Ethylene olefin units units

X, y and z are cardinal numbers. While these terpolymers are essentially amorphous in character by superficial inspection, they may contain up to about 25 percent by weight of crystalline segments as determined by X-ray or differential scanning calorimetry. Details of these methods for measurements of crystallinity are found in J. Polymer Science, A-2, 9, 127 (1971) by G. Ver Strate and Z. W. Wilchinsky.

Terpolymers, useful in the present invention contain at least 30 mol percent, preferably not more than 85 mol percent of ethylene; between about 15 and about 70 mol. percent of a higher alphaolefin or mixture thereof, preferably propylene; and between 1 and 20 mol. percent, preferably 1 to 15 mol. percent, of a non-conjugated diene or mixture thereof. Especially preferred are polymers of about 40 to 70 mol. percent ethylene, 20 to 58 mol. percent higher monoolefin and 20 to 10 mol. percent diene. On a weight basis, usually the diene will be at least 2 or 3 wt. percent of the total terpolymer.

The terpolymer is first reacted with maleic anhydride in the presence of a solvent. The maleic anhydride reacts with the double bonds available on the diene portion of the terpolymer. Usually, about 10 to 100%, preferably 50 to 95% of the double bonds in the terpolymer are converted to succinic anhydride groups. Since it is uneconomical for practical purposes to attempt to convert all of the double bonds in the terpolymer molecule to anhydride groups, the structure of the resulting maleated polymer will typically contain some unreacted double bonds.

Various solvents may be employed in the maleation step including generally olefin-free petroleum hydrocarbons, aromatics and halogenated hydrocarbons. A preferred solvent is a lubricating oil basestock. A much preferred solvent is trichlorobenzene. Preferably, a concentration in the range of about 1 to 10 percent by weight of terpolymer in solvent may conveniently be used for maleation.

An excess of maleic anhydride over the stoichiometrically necessary to react with all the double bonds present in the diene portion of the terpolymer is typically employed. Preferably, at least one mole of maleic anhydride is used for each mole of diene monomer present in the terpolymer, with molar ratios of maleic anhydride to diene of between about 1:1 and 2:1 being particularly suitable. Less than stoichiometric amounts of maleic anhydride may also be used.

The mealeation may occur with or without the use of catalyst or radical initiators such as tertiary hydroperoxide. During thermal reaction, the temperature is typically maintained between about 180 and 250° C for between about 1 hour and about 10 hours. Typical conditions are about 225° C for about 4 hours. Any excess maleic anhydride is typically removed by either vacuum distillation or throughthe use of a stripping gas stream.

In a preferred embodiment, the maleation takes place in the presence of chlorine. Chlorination has been disclosed with polymers in isobutene in U.K. Pat. No. 949,981. The molar amount of chlorine used is preferably such that the mixture of polymer and maleic anhydride is contacted with from 0.3 to 1.5, more preferably from 0.5 to 1.2 moles of chlorine for each mole of maleic anhydride. Insofar as the conversion of the polymer is concerned there appears to be no lower limit on the amount of chlorine which may be used. In practice, however, it is preferred to remain within the aforesaid ranges.

Suitably the mixture of polymer and maleic anhydride is heated to the reaction temperature before it is contacted with the chlorine. The mixture is contacted with a molar deficiency of chlorine before any substantial amount, e.g. less than half, of the maleic anhydride has reacted. Suitably, substantially none of the maleic anhydride has reacted. The rate of introduction of chlorine into the mixture may vary between wide limits but is preferably such that it equals the rate of chlorine uptake. Usually the chlorine is introduced over a period of from 0.5 to 10 hours, preferably of from 3 to 7 hours, at a temperature of between about ambient to 100° C.

After the chlorination treatment it is advantageous to subject the resultant product mixture to a post-reaction or thermal treatment. This thermal treatment is suitably carried out at a temperature in the range of from 140° to 220° C, preferably from 160° to 210° C. The conditions are usually such, e.g. reflux conditions, that substantially no part of the product mixture is removed during this thermal treatment. The thermal treatment may be for 0.1 to 20 hours but is preferably from 0.5 to 10 hours. Longer periods tend to increase the formation of tarry by-products.

the maleated polymer is then reacted with an alkane polyol to form the oil-soluble product of the instant invention. The resulting esters of succinic acid provide the dispersant function of the additive.

The alkane polyols useful in making the esters are alkanepolyols having at least two and preferably at least four hydroxy groups such as the trihydroxyalkanes, e.g. trihydroxybutanes, pentanes, hexanes, heptanes, octanes, nonanes, dodecanes, etc., as well as tetrahydroxy alkanes, pentahydroxy alkanes, hexahydroxy alkanes, as well as the sugar alcohols such as erythritol, pentaerythritol tetritols, pentitols, hexitols, mannitol, sorbitol, glucose, and the like. Particularly preferred alcohols are pentaerythritol and mannitol. Especially preferred is pentaerythritol.

The molar ratio of polyol to maleic anhydride is typically between about 0.1:1 and about 2:1, preferably between about 0.5:1 and about 2:1, most preferably about 1:1. The conditions during esterification are typically about 150° to 250° C for between about 1 hour and about 20 hours.

In both the esterification and maleation steps it is much preferred that the reactions take place in the absence of oxygen. A nitrogen blanket is often used to accomplish this result. The reason for performing the reaction in the absence of oxygen is that the resulting additive may be more oxidatively unstable if any oxygen is present during the formation of the additive.

If excess polyol is employed, then it may be desirable to remove the excess. One means of doing this is to first add a volume of heptane equal to the volume of dissolved additive. Then an equal volume of methanol is added. Two separate layers are therein formed; a bottom layer comprising predominantly methanol and the unreacted polyol and a top layer comprising predominantly heptane, the solvent volatiles present in the top layer can then be removed by a distillation technique. Alternatively the excess polyol may be removed under a vacuum or with a stripping gas stream.

The reaction product of this invention can be incorporated in lubricating oil compositions, e.g., automotive crankcase oils, in concentrations within the range of about 0.1 to about 10, preferably about 0.1 to 3, weight percent based on the weight of the total compositions. The lubricating oils to which the additives of the invention can be added include not only mineral lubricating oils, but synthetic oils also. Synthetic hydrocarbon lubricating oils may also be employed, as well as non-hydrocarbon synthetic oils including dibasic acid esters such as di-2-ethyl hexyl sebacate, carbonate esters, phosphate esters, halogenated hydrocarbons, polysilicones, polyglycols, glycol esters such as $C_{13}$ oxo acid diesters of tetraethylene glycol, etc. When used in gasoline or fuel oil, e.g., Diesel fuel, No. 2 fuel oil, etc., then usually about 0.001 to .5 wt. percent, based on the weight of the total composition of the reaction product will be used. Concentrates comprising a minor proportion, e.g., 10 to 45 wt. percent, of said reaction product in a major amount of hydrocarbon diluent, e.g., 95 to 55 wt. percent mineral lubricating oil, with or without other additives present, can also be prepared for ease of handling.

If the terpolymer originally employed had a sufficiently low molecular weight, e.g., between about 70,000 and about 150,000, then the final additive product should have sufficient viscosity-index improving properties. However, as stated above, it is possible to prepare the instant additive product starting with a terpolymer having a high molecular weight between about 200,000 and about 1,000,000. When employing the higher molecular weight terpolymer, it is necessary to subject the resulting higher molecular weight additive product to a shearing condition in order to reduce the molecular weight of the additive to the desired molecular weight. One shearing mechanism involves adding a solvent such as heptane to the additive product in order to reduce the viscosity, and then pumping the solution through a Diesel injection nozzle at high pressures, such as above about 1000 psig. Other high shear devices include high shear mixers and pumps such as a gear pump. The molecular weight of the resulting polymer can be controlled by varying the number of times that the solution is pumped through the nozzle or high shear device. In addition to reducing the molecular weight of the additive product to within the desired range, shearing also narrows the molecular weight distribution since bigger molecules are sheared more readily than smaller molecules. This narrower molecular weight distribution is advantageous since it results in greater stability in the engine. It is preferred that the ratio of ($M_w/M_n$) be between about 1 and about 4 where $M_w$ is the weight average molecular weight and $M_n$ is the number average molecular weight.

In the above compositions or concentrates, other conventional additives may also be present, including dyes, pour point depressant, antiwear agents, e.g., tricresyl phosphate, zinc dialkyl dithiophosphates of 3 to 8 carbon atoms, antioxidants such as phenyl-alpha-naphthylamine, tert. octyphenol sulfide, bis-phenols such as 4,4'-methylene bis(3,6-di-tert. butylphenol), viscosity index improvers such as the ethylene-higher olefin copolymer, polymethylacrylates, polyisobutylene, alkyl fumarate-vinyl acetate copolymers, and the like as well as other ashless dispersants or detergents such as overbased sulfonates.

The invention is further illustrated by means of the following illustrative embodiment, which is given for the purpose of illustration alone and is not meant to limit the invention to the particular reactants and amounts disclosed.

ILLUSTRATIVE EMBODIMENT I

In illustrative Embodiment I, 10 grams of Ortholeum 2052 (an EPDM having about 48% ethylene groups, 48% propylene groups, and 4%, 1,4-hexadiene groups) was dissolved in 190 grams of 1,2,4-trichlorobenzene. The EPDM was then lightly chlorinated by bubbling chlorine through the solution at 60° C for 2–3 minutes. Then 1.38 grams of maleic anhydride was added and the solution was heated at 180° C for two hours. Any excess maleic anhydride was stripped away with nitrogen.

Next, 1.92 grams of pentaerythritol was added and the solution was then heated at 200°–215° C for 12 hours. The additive product was then recovered by exchanging solvent for an equal volume of 100 neutral lubricating oil. Then the dissolved product was diluted with heptane and washed with methanol before volatiles were distilled off.

A Spot Dispersancy Test (SDT) was performed on a 2% by weight solution of the product additive mixed 1:2 with used Sequence VC test oil and heated at 150° C for 16 hours. The Spot Dispersancy Test measures the ability of a given concentration of dispersant to facilitate movement of suspended sludge on blotter paper. The SDT result was 66% as compared to 25% for an EPDM/maleic anhydride additive not reacted with pentaerythritol.

What is claimed is:

1. The oil-soluble product prepared by the process comprising:
   a. reacting a terpolymer with maleic anhydride at a temperature of between about 180° C and 250° C wherein the terpolymer has a molecular weight of between about 70,000 and 150,000 and comprises about 30 to 85 mole percent ethylene, about 15 to 70 mole percent of a $C_3$ to $C_8$ alpha monoolefin and about 1 to about 20 mole percent of a $C_5$ to $C_{14}$ non-conjugated diene; and
   b. reacting the product of step (a) with an alkane polyol having at least two hydroxy groups at a temperature of between about 150° C and about 250° C.

2. The composition of claim 1 wherein said terpolymer and maleic anhydride are reacted in the presence of a trichlorobenzene solvent in a molar ratio of maleic anhydride to the diene portion of the terpolymer of between about 1:1 and about 2:1.

3. The composition of claim 2 wherein said terpolymer and maleic anhydride are reacted in the presence of a trichlorobenzene solvent and chlorine in a molar ratio of chlorine to maleic anhydride of between about 0.3:1 and 1.5:1.

4. The composition of claim 1 wherein the diene is ethylidene norbornene and the $C_3$ to $C_8$ alpha monoolefin is propylene.

5. The composition of claim 1 wherein the alkane polyol is pentaerythritol and the molar ratio of polyol to maleic anhydride is between about 0.5:1 and about 2:1.

6. The oil-soluble product prepared by the process comprising:
   c. reacting a terpolymer with maleic anhydride in the presence of a solvent and at a temperature of between about 180° C and 250° C wherein the terpolymer has a molecular weight of between about 70,000 and 1,000,000 and comprises about 30 to 85 mole percent ethylene, about 15 to 70 mole percent of a $C_3$ to $C_8$ alpha monoolefin and about 1 to about 20 mole percent of a $C_5$ to $C_{14}$ non-conjugated diene;
   d. reacting the product of step (c) with an alkane polyol having at least two hydroxy groups at a temperature of between about 150° C and about 250° C; and
   e. subjecting the product of step (d) to a repeated shearing action so as to reduce the molecular weight of the oil-soluble product to between about 70,000 and 150,000, and the ratio of Mw/Mn to between 1 and 4.

7. The composition of claim 6 wherein the alkane polyol is pentaerythritol and the molar ratio of polyol to maleic anhydride is between about 0.5:1 and about 2:1.

8. A lubricating composition comprising a major amount of a lubricating oil and from about 0.1 to about 15.0 weight percent of the oil-soluble product of claim 1.

9. A lubricating composition comprising a major amount of a lubricating oil and from 0.1 to about 15.0 weight percent of the oil-soluble product of claim 6.

10. A lubricating concentrate composition comprising a major amount of a lubricating oil and from about 10 to about 45 weight percent of the oil-soluble product of claim 1.

* * * * *